(12) United States Patent
Yamaguchi

(10) Patent No.: US 10,500,491 B2
(45) Date of Patent: Dec. 10, 2019

(54) PROGRAM, SYSTEM, AND METHOD FOR PROVIDING GAME

(71) Applicant: DeNA Co., Ltd., Shibuya-ku, Tokyo (JP)

(72) Inventor: Makoto Yamaguchi, Tokyo (JP)

(73) Assignee: DENA CO., LTD., Tokyo (JP)

( * ) Notice: Subject to any disclaimer, the term of this patent is extended or adjusted under 35 U.S.C. 154(b) by 54 days.

(21) Appl. No.: 15/662,749

(22) Filed: Jul. 28, 2017

(65) Prior Publication Data

US 2018/0028914 A1 Feb. 1, 2018

(51) Int. Cl.
| | |
|---|---|
| A63F 13/45 | (2014.01) |
| A63F 13/2145 | (2014.01) |
| A63F 13/40 | (2014.01) |
| A63F 13/422 | (2014.01) |
| A63F 13/25 | (2014.01) |
| A63F 13/335 | (2014.01) |
| A63F 13/35 | (2014.01) |
| A63F 13/92 | (2014.01) |

(52) U.S. Cl.
CPC .......... *A63F 13/45* (2014.09); *A63F 13/2145* (2014.09); *A63F 13/25* (2014.09); *A63F 13/335* (2014.09); *A63F 13/35* (2014.09); *A63F 13/40* (2014.09)

(58) Field of Classification Search
CPC ........ A63F 13/45; A63F 13/92; A63F 13/422; A63F 13/35; A63F 13/2145; A63F 13/40; A63F 13/335; A63F 13/25
See application file for complete search history.

(56) References Cited

U.S. PATENT DOCUMENTS

| | | | |
|---|---|---|---|
| 8,926,430 B1* | 1/2015 | Ikeda | A63F 13/40 463/31 |
| 2014/0066195 A1* | 3/2014 | Matsui | A63F 13/42 463/30 |
| 2015/0038223 A1 | 7/2015 | Watabe | |

FOREIGN PATENT DOCUMENTS

| | | |
|---|---|---|
| JP | H08-280933 A | 10/1996 |
| JP | 2015-029520 A | 2/2015 |
| JP | 2015-073796 A | 4/2015 |

OTHER PUBLICATIONS

Notice for Reasons for Rejection for JP App No: 2016-150756 dated Sep. 20, 2016, 8 pgs.

* cited by examiner

*Primary Examiner* — James S. McCellan
*Assistant Examiner* — Peter J Iannuzzi
(74) *Attorney, Agent, or Firm* — Procopio, Cory, Hargreaves & Savitch LLP

(57) ABSTRACT

A user terminal pertaining to an embodiment of the present invention functions as a device that provides a game to a player. This user terminal initiates an auto mode in which the game proceeds automatically in response to a first operation in which a specific state of operation by the player is maintained and ends this auto mode in response to a second operation in which the specific state of operation by the player is cancelled. As a result, the start and end of the auto mode are realized by simple, continuous operations, and operations related to automatic progress of the game are facilitated.

18 Claims, 7 Drawing Sheets

PROGRAM, SYSTEM, AND METHOD FOR PROVIDING GAME

This application claims foreign priority under 35 USC 119 based on Japanese Patent Application No. 2016-150756, filed on Jul. 29, 2016, the contents of which is incorporated herein in its entirety by reference.

BACKGROUND

1. Technical Field

The present invention relates to a program (e.g., non-transitory computer-readable medium having a storage including instructions to be performed by a processor), a system, and a method for providing a game.

2. Related Art

Techniques for causing a game to proceed automatically have been proposed in the past. For example, the RPG disclosed in the following Patent Document 1 is configured so that a player character automatically moves toward a specific destination in response to a tap operation at some position on the game screen. This automatic movement is cancelled when the player character reaches the destination, or is cancelled when a manual operation involving touching and sliding the player character is performed during automatic movement.

PRIOR ART DOCUMENT

Patent Document

[Patent Document 1] Patent Document 1: Japanese Patent Application 2015-029520

SUMMARY

Problems to be Solved by the Invention

However, with the conventional game discussed above, the above-mentioned manual operation (touching and sliding the player character) is necessary to cancel the automatic movement during the movement, and a player may feel that this operation is bothersome. Also, if the player wants to cancel automatic movement quickly (for example, when the player wants to acquire an item discovered during automatic movement), the above-mentioned manual operation can end up hampering the quick cancellation of the automatic movement. Thus, with a conventional game, there is room for improvement in terms of ease of operation related to automatic progress of the game.

One object of the embodiments of the present invention is to facilitate operations related to the automatic progress of a game. Other objects of embodiments of the present invention will become clear by referring to this Specification as a whole.

Means for Solving the Problems

The program (e.g., non-transitory computer-readable medium having a storage including instructions to be performed by a processor) pertaining to an embodiment of the present invention is a program for providing a game which, in response to being executed on a computer, causes the computer to execute the following steps: controlling the progress of the game in a manual mode in which the game proceeds in response to an operation by a player; initiating an auto mode in which the game proceeds automatically in response to a first operation that maintains a specific state of operation by the player; controlling the progress of the game in the auto mode; and ending the auto mode in response to a second operation that cancels the specific state of operation by the player.

The system pertaining to an embodiment of the present invention comprises one or more computer processors and is a system for providing games, said system causing the one or more computer processors to execute the following steps in response to the execution of a readable command: controlling the progress of the game in a manual mode in which the game proceeds in response to an operation by a player; initiating an auto mode in which the game proceeds automatically in response to a first operation that maintains a specific state of operation by the player; controlling the progress of the game in the auto mode; and ending the auto mode in response to a second operation that cancels the specific state of operation by the player.

The method pertaining to an embodiment of the present invention is a method for providing a game, which is executed by one or more computer processors, said method comprising the following steps: controlling the progress of the game in a manual mode in which the game proceeds in response to an operation by a player; initiating an auto mode in which the game proceeds automatically in response to a first operation that maintains a specific state of operation by the player; controlling the progress of the game in the auto mode; and ending the auto mode in response to a second operation that cancels the specific state of operation by the player.

Effects of the Invention

Various embodiments of the present invention facilitate operations related to the automatic progress of a game.

DETAILED DESCRIPTION

Mode for Carrying Out the Invention

Embodiments of the present invention will now be described through reference to the drawings.

Figure 1:
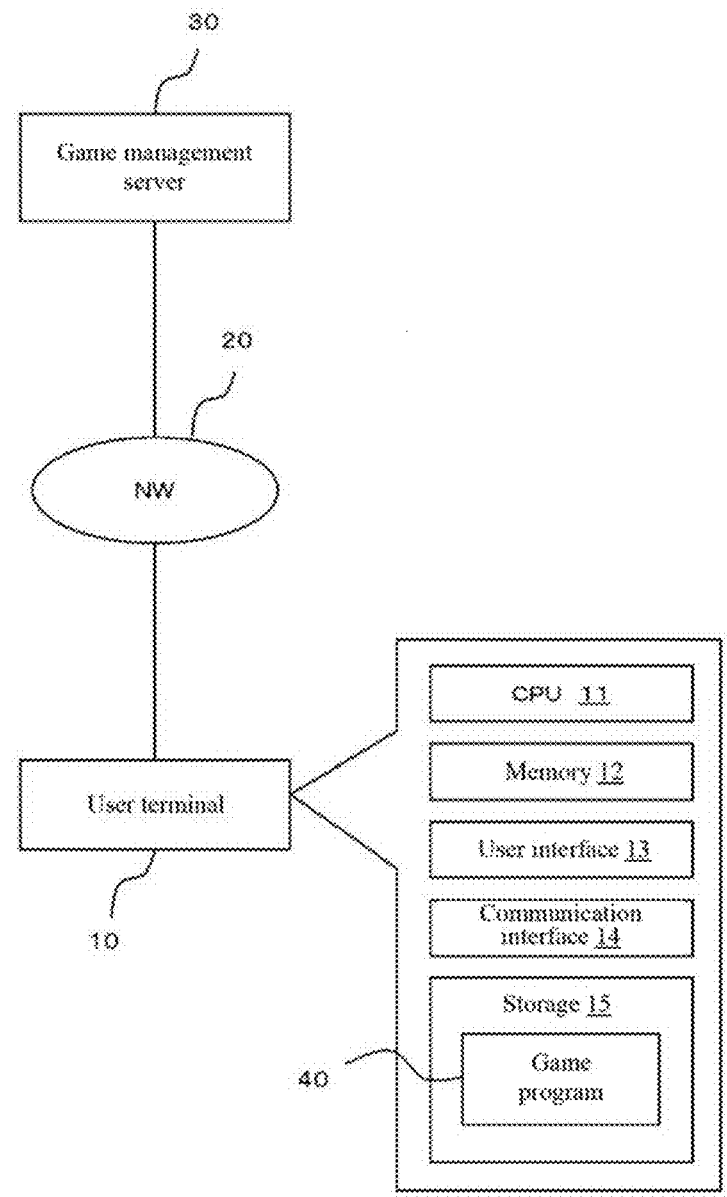
FIG. 1 A simplified configuration diagram showing the configuration of a network that includes a user terminal 10 pertaining to an embodiment of the present invention.

FIG. 1 is a simplified configuration diagram showing the configuration of a network that includes a user terminal 10 pertaining to an embodiment of the present invention. As shown in FIG. 1, the user terminal 10 is connected to a game management server 30 so as to be able to communicate via a network 20 such as the Internet. The user terminal 10 functions as a device that provides a game to a player. The user terminal 10 is an example of a device in which all or part of the system of the present invention is installed.

As shown in FIG. 1, the user terminal 10 is configured as a typical computer, and comprises a CPU (computer processor) 11, a main memory 12, a user interface 13, a communication interface 14, and storage (storage unit) 15. These constituent elements are electrically connected via a bus (not shown) or the like.

The CPU 11 reads various programs (e.g., one or more non-transitory computer-readable media having a storage including instructions to be performed by a processor) stored in the storage 15 or the like into the main memory 12 and executes various commands included in the programs. The main memory 12 is constituted by, for example, a DRAM or the like.

The user interface 13 is any of various kinds of input/output device for exchanging information with the user. For example, the user interface 13 includes an information input device such as a keyboard, a pointing device (such as a mouse or a touch panel), a game pad, or a motion recognition system (a system that recognizes body or hand movements); a voice input device such as a microphone; and an image input device such as a camera. The user interface 13 also includes an information output device (display device) such as a display, and an audio output device such as a speaker.

The communication interface 14 is hardware such as a network adapter, any of various kinds of communication software, or a combination thereof, and is configured to allow for wired or wireless communication via the network 20 or the like.

The storage 15 is constituted, for example, by a magnetic disk, a flash memory, or the like. The storage 15 stores various programs (e.g., non-transitory computer-readable medium having a storage including instructions to be performed by a processor), data, and so forth, including operating systems. The programs stored in the storage 15 can be downloaded and installed from an application market or the like. In this embodiment, the programs stored in the storage 15 include a game program 40 pertaining to an embodiment of the present invention. The game program 40 is a program (e.g., non-transitory computer-readable medium having a storage including instructions to be performed by a processor) for causing the user terminal 10 to function as a device that provides a game.

In this embodiment, the user terminal 10 may be configured as a smart phone, a tablet terminal, a wearable device, a personal computer, a dedicated game terminal, a VR (virtual reality) device (head mounted display, etc.), or the like.

Like the user terminal 10, the game management server 30 is configured as a typical computer. The game management server 30 stores and manages information related to the game provided by the user terminal 10. For example, the game management server 30 manages the progress status of the game for each player, game data (such as game data for each stage), and so on. The game management server 30 can also be configured by using a plurality of server devices each configured as a typical computer.

For example, in response to activation of the game program 40 (e.g., non-transitory computer-readable medium having a storage including instructions to be performed by a processor), the user terminal 10 acquires game data and the progress status achieved by the player in the game from the game management server 30. Also, for example, while executing the game program 40, the user terminal 10 acquires game data from the game management server 30 (for example, after clearing a specific stage, it acquires game data for the following stage), and transmits the latest progress status achieved by the player in the game to the game management server 30.

Figure 2:
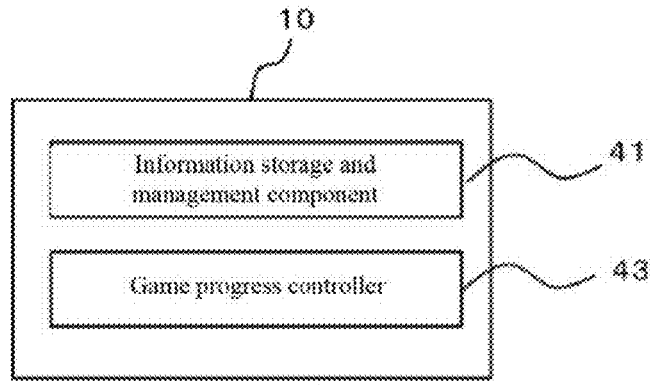
FIG. 2 A simplified block diagram showing the functions of the user terminal 10.

The functions of the user terminal 10 in this embodiment will now be described. FIG. 2 is a simplified block diagram showing the functions of the user terminal 10. As shown in the drawing, the user terminal 10 comprises an information storage and management component 41 for storing and managing information, and a game progress controller 43 for controlling progress of the game. These functions are realized by the cooperative operation of the hardware such as the CPU 11, the main memory 12, etc., and the various programs (including the game program 40) or other data stored in the storage 15, etc., and are realized, for example, when the CPU 11 executes commands included in the programs read into the main memory 12. Some or all of the functions shown in FIG. 2 can be realized by cooperation between the user terminal 10 and the game management server 30, or can be realized by the game management server 30 alone.

The information storage and management component 41 stores and manages the various information in the storage 15, etc. The game progress controller 43 executes various processing related to the control of the progress of the game. For example, the game progress controller 43 executes various processing related to the progress of the game and displays various screens according to the result of that processing.

In this embodiment, the game progress controller 43 is configured to control the progress of the game in manual mode, in which the game proceeds in response to an operation by the player. For example, in manual mode the game progress controller 43 waits for an operation by the player, executes the corresponding processing according to the operation by the player, and causes the game to proceed according to the result of that processing, with this procedure being repeated. The operation by the player is performed through any of various input means, such as the above-mentioned information input device, a voice input device, an image input device, or the like.

Also, the game progress controller 43 is configured to control the progress of the game in auto mode, in which the game proceeds automatically. For example, in auto mode the game progress controller 43 specifies processing to cause the game to proceed automatically, executes the specified processing, and causes the game to proceed according to the result of the processing, with this procedure being repeated. The auto mode can thus be said to be a mode in which the game proceeds automatically, without individual operations by the player.

The game progress controller 43 is also configured to start auto mode in response to a first operation by the player and to end auto mode in response to a second operation by the player. The first operation is an operation that maintains a specific state of operation, and the second operation is an operation that cancels said specific state of operation. That is, auto mode, which starts in response to an operation that maintains a specific state of operation by the player, ends in response to an operation that cancels said specific state of operation.

The user terminal 10 in this embodiment thus initiates auto mode in response to an operation that maintains a specific state of operation and ends auto mode in response to an operation that cancels said specific state of operation, and thus, the start and end of auto mode are realized by a simple continuous operation. The user terminal 10 in this embodiment thus facilitates operation related to the automatic progress of the game.

In this embodiment, the above-mentioned specific state of operation includes various states based on operations by the player. For instance, a specific state of operation is a touch state on a specific object displayed on the screen (a state in which the fingertip of the player, etc., is touching a specific object through a touch panel). In this case, for example, the game progress controller 43 initiates the auto mode when a touch state on a specific object is maintained for a specific length of time, and ends the auto mode when this touch state is cancelled (when the player's fingertip, etc., is lifted from the specific object). An operation that maintains a touch state is sometimes called a long tap operation.

Also, the game progress controller 43 may be configured so that, in auto mode, a control mode of the auto mode is set according to a third operation on a specific object by the player. In auto mode, since the touch state on the specific object is maintained, the third operation can be said to be an operation that starts with a touch state on a specific object. This configuration assists the player with setting the control mode with a simple operation in auto mode. The control mode of the auto mode includes, for example, rules for causing the game to proceed automatically, and the speed at which the game proceeds automatically.

In this embodiment, the third operation is, for example, a swipe operation (an operation of sliding a finger or the like that is touching a specific object). In this case, the game progress controller 43 may be configured so that the control mode is set on the basis of the direction of the swipe operation. For example, as rules for causing the game to proceed automatically, the game progress controller 43 sets a first rule (such as a rule that gives priority to fighting an enemy character in an RPG) when the direction of the swipe operation is a first direction (such as to the right), and sets a second rule (such as a rule that gives priority to the use of items in an RPG) when the direction of the swipe operation is a second direction (such as to the left).

The game progress controller 43 may also be configured so that the control mode is set on the basis of the distance of the swipe operation. For example, as the speed at which the game proceeds automatically, the game progress controller 43 sets a speed of 1.5 times (the normal speed) when the distance of the swipe operation is within a first range, and sets a speed of 2.0 times when the distance of the swipe operation is within a second range that is longer than the first range.

Here, a swipe operation is an example of a third operation, and this third operation includes various kinds of operations besides a swipe operation. For example, the third operation includes an operation of firmly pressing the touch panel (sometimes referred to as "3D touch"), in which case the game progress controller 43 may be configured to set the control mode on the basis of how firmly the specific object was pressed.

Here, the specific state of operation in this embodiment is not limited to the above-mentioned touch state on a specific object, and also includes, for example, a state in which a long tap is made at some position on the screen via the touch panel on a smart phone or the like, a state in which a particular button on the physical controller of a game pad or the like is pressed, a state in which motion of a body or a hand recognized through the motion recognition system is preserved in a specific posture, a state in which an object in the game space corresponding to a body or hand recognized via the motion recognition system touches a specific object located in the same game space, and so forth. The specific state of operation in this embodiment thus includes various states based on various operations made by the player through the various input means mentioned above.

The game progress controller 43 may also be configured to continue the auto mode when the second operation that cancels the touch state on the specific object is accompanied by a fourth operation on the specific object. This fourth operation is, for example, a swipe operation. In this case, the game progress controller 43 ends the auto mode when the touch state on the specific object is cancelled without a swipe operation, and maintains the auto mode when the touch state is cancelled with a swipe operation. This configuration can assist a player who does not want to maintain a touch state for a long time to continue the auto mode.

The game progress controller 43 can also be configured to end the auto mode according to the state of the game. For example, the game progress controller 43 is configured so that when the state of the game is one that requires a warning to the player (such as when a parameter value, such as of the player character's HP, is less than or equal to a specific value), the auto mode is ended regardless of any second operation.

The game in this embodiment is configured to proceed in accordance with the execution of commands, for example. In this case, the game progress controller 43 is configured to repeat a procedure in which in manual mode commands are executed in response to an operation by the player, and in auto mode automatically specified commands are executed. The game progress controller 43 may also be configured to perform the execution of an automatically specified command one time in response to a tap operation on a specific object by the player in manual mode. In this case, the game progress controller 43 is configured so that auto mode is initiated in response to a long tap operation on a specific object, but even in manual mode an automatically specified command will be executed one time in response to a tap operation on a specific object. Such a configuration can assist the player to easily switch between the automatic execution of commands that end after one time and the automatic execution of commands that are repeatedly executed until the touch state is cancelled.

The game progress controller 43 may also be configured to display automatically specified commands in auto mode. For example, the game progress controller 43 is configured to display on the game screen one or more recently executed commands or one or more automatically specified and executed commands. This configuration assists the player in recognizing automatically specified commands.

Here, a game configured to proceed in response to the execution of commands includes, for example, a turn-based game in which turns on the player side alternately repeat with turns on the enemy side. One example of such a turn-based game is a turn-based RPG in which turns in which a character on the player side (including at least a player character) acts are alternately repeated with turns in which an enemy character acts. The game in this embodiment is not limited to the above-mentioned turn-based RPG, and also includes RPGs in other forms such as action RPGs, and games of various other genres such as simulation games.

Next, the operation of the user terminal 10 in this embodiment having these functions will be described using a specific example according to this embodiment. In this example, the game provided by the user terminal 10 is an RPG in which a player character explores the game space, battles enemy characters present in the game space, collects items present in the game space, and so on, all while heading for a destination. For example, the game space is configured as a dungeon composed of a number of floors, and defeating a boss character present in the deepest part is a condition for clearing this dungeon (stage).

Also, the game in this example is configured as a turn-based RPG in which turns in which a character on a player side acts and turns in which an enemy character acts are alternately repeated. These RPGs are sometimes called rogue-like games. The characters on the player side include non-player characters controlled by a computer (the game progress controller 43) in addition to the player character.

Figure 3:
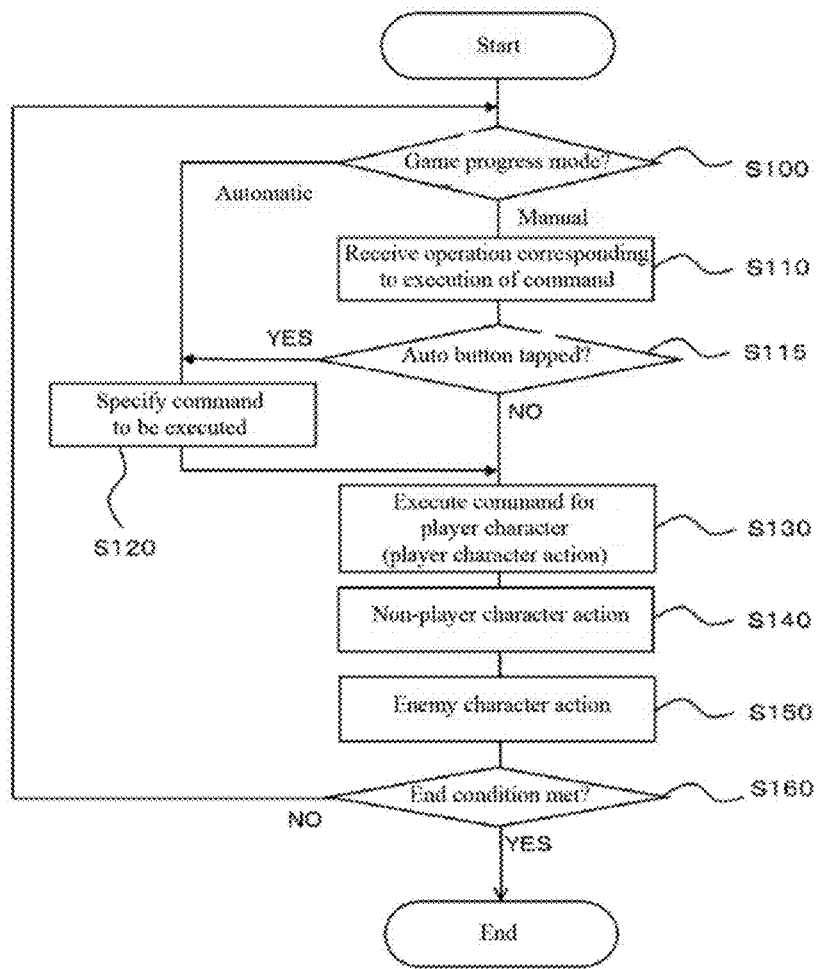
FIG. 3 A flowchart showing an example of processing executed by the user terminal 10.

FIG. 3 is a flowchart showing a processing executed by the user terminal 10 in this example. In the RPG in this example, game progress modes include a manual mode in which the game proceeds in response to operations by the player, and an auto mode in which the game proceeds automatically without individual operations by the player. First, when the progress mode of the game is the manual mode, an operation corresponding to the execution of a command from the player is accepted (steps S100 to S110). This operation corresponding to the execution of a command is performed via the game screen 50 displayed on the user terminal 10. Here, the game screen 50 shown as an example in FIG. 4 will be described.

Figure 4:
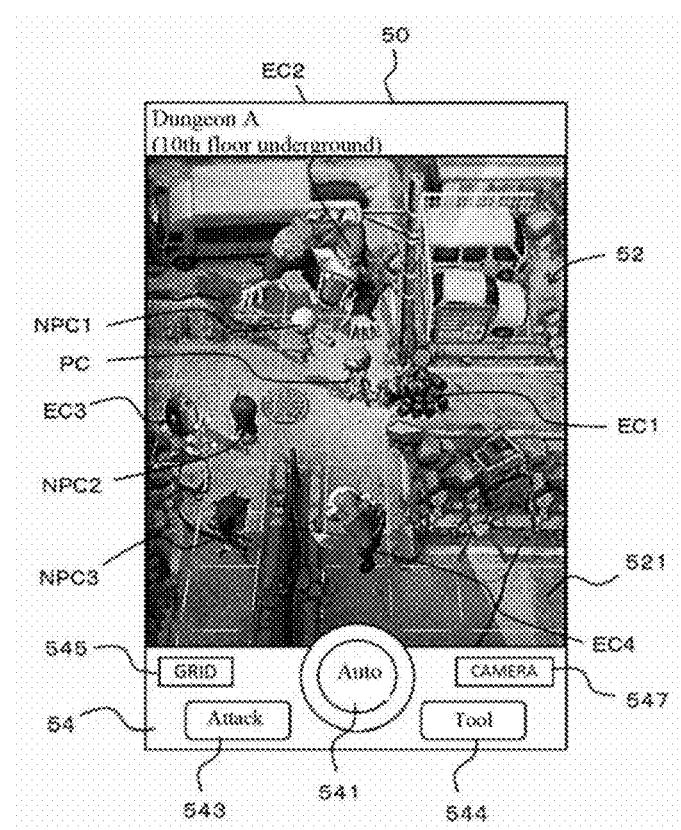
FIG. 4 A diagram showing an example of a game screen 50.

As shown in FIG. 4, the game screen 50 has a game space display area 52 that is located in the approximate center of the screen and that displays a game space, and an operation area 54 that is located at the bottom of the screen and accepts operations by the player. As shown in the drawing, the game space display area 52 displays an image corresponding to a field of view in which the player character is positioned in the approximate center of the entire game space. Specifically, an image captured by a virtual camera in the game space is displayed in the game space display area 52, and movement of this virtual camera is controlled to track the player character.

As described above, characters on the player side include non-player characters in addition to the player character. In the game space display area 52 of the game screen 50 in FIG. 4, three non-player characters NPC 1 to 3 are displayed in addition to the player character PC. As will be discussed in detail below, the non-player characters are controlled so as to perform an action automatically in response to the actions of the player character.

Also, as described above, there are enemy characters and items in the game space. In the game space display area 52 of the game screen 50 in FIG. 4, four enemy characters EC 1 to 4 are displayed. The enemy characters and items are disposed at predetermined positions in the game space.

As shown in FIG. 4, in the game space display area 52, a grid (lattice) is displayed in part of the area of the game field in the game space. The area in which this grid is displayed is the movable area 521 in which characters can move. Within the game field in the game space, no grid is displayed in areas where there are obstacles such as buildings, and those are areas in which characters cannot move. Also, even in the movable area 521, characters on the player side cannot pass through squares in which enemy characters are located. That is, characters on the player side can move over squares where there are no enemy characters in the movable region 521.

When the player performs a tap operation in the movable area 521 displayed in the game space display area 52, the player character PC moves to the position of the square corresponding to the tap operation. That is, the tap operation in the movable area 521 is an operation corresponding to the execution of a movement command for the player character. When the path of movement is blocked by an enemy character, the player character PC moves to a position facing the enemy character and stops.

As shown in FIG. 4, an auto button (specific object) 541 located in the approximate center and having a double circle shape, an attack button 543 located to the lower left of the auto button 541, a tool button 544 located to the lower right of the auto button 541, a grid display switching button 545 located to the upper left of the attack button 543 and displayed as "GRID," and a camera switching button 547 located to the upper right of the tool button 544 and displayed as "CAMERA" are displayed in the operation area 54.

The auto button 541 is an object used for performing an operation related to the automatic execution of a command. When the player performs a long tap operation (first operation) on the auto button 541 in manual mode, this initiates the auto mode in which the game proceeds automatically. Also, when the player performs an operation (second operation) of canceling the touch state on the auto button 541 in auto mode, this ends the auto mode (the mode returns to manual). Furthermore, when the player performs a tap operation (fourth operation) on the auto button 541 in the manual mode, the command is automatically executed one time for the player character. That is, the tap operation on the auto button 541 is an operation corresponding to a one-time execution of an automatically specified command for the player character.

The attack button 543 is an object used for inputting an attack command for the player character. When the player performs a tap operation on the attack button 543, an attack on an enemy character positioned within the attack range of the player character (for example, eight surrounding squares) is performed. That is, the tap operation on the attack button 543 is an operation corresponding to the execution of an attack command for the player character. For example, when a tap operation is performed on the attack button 543 on the game screen 50 in FIG. 4, an attack is performed on the enemy character EC1 adjacent on the right side of the player character PC. When a plurality of enemy characters are present within the attack range, a tap operation for selecting the enemy character to be attacked may be accepted after the tap operation of the attack button 543. The attack button 543 is configured so as not to function when there is no enemy character within the attack range of the player character.

An attack on an enemy character is processing that inflicts damage on the enemy character. For example, the damage is calculated on the basis of a comparison of parameter values set for opposing characters (such as attack strength and defensive strength), and the calculated damage is subtracted from the HP of the enemy character. As a result of the attack, if the enemy character is knocked down (for example, if the HP of the enemy character drops to zero), the enemy character disappears and the player character acquires a reward such as an experience value. If an enemy character is blocking the path of movement, the path may be opened by defeating that enemy character.

The tool button 544 is an object for inputting tool commands for the player character. When the player performs a tap operation on the tool button 544, a screen is displayed for selecting which item is to be used from among the items possessed by the player character, and the selected item is used via the screen. That is, the tap operation on the tool button 544 is an operation corresponding to the execution of a tool command for the player character. As the item is used, for example, the parameter values of the player character and/or the non-player characters change (such as an increase in attack strength, defensive strength, or HP), or a special attack on the enemy character is performed. A special attack is, for example, an attack that has a wider attack range and/or inflicts greater damage than the ordinary attack corresponding to the attack button 543.

The grid display switching button 545 and the camera switching button 547 are objects for changing the display mode of the game space in the game space display area 52. When the player performs a tap operation on the grid display switching button 545, this switches between the display and non-display of grid squares in the game space display region 52. For example, a player who places more priority on the aesthetics of the game space displayed in the game space display area 52 than on ease of operation may choose to hide the grid.

Figure 5:
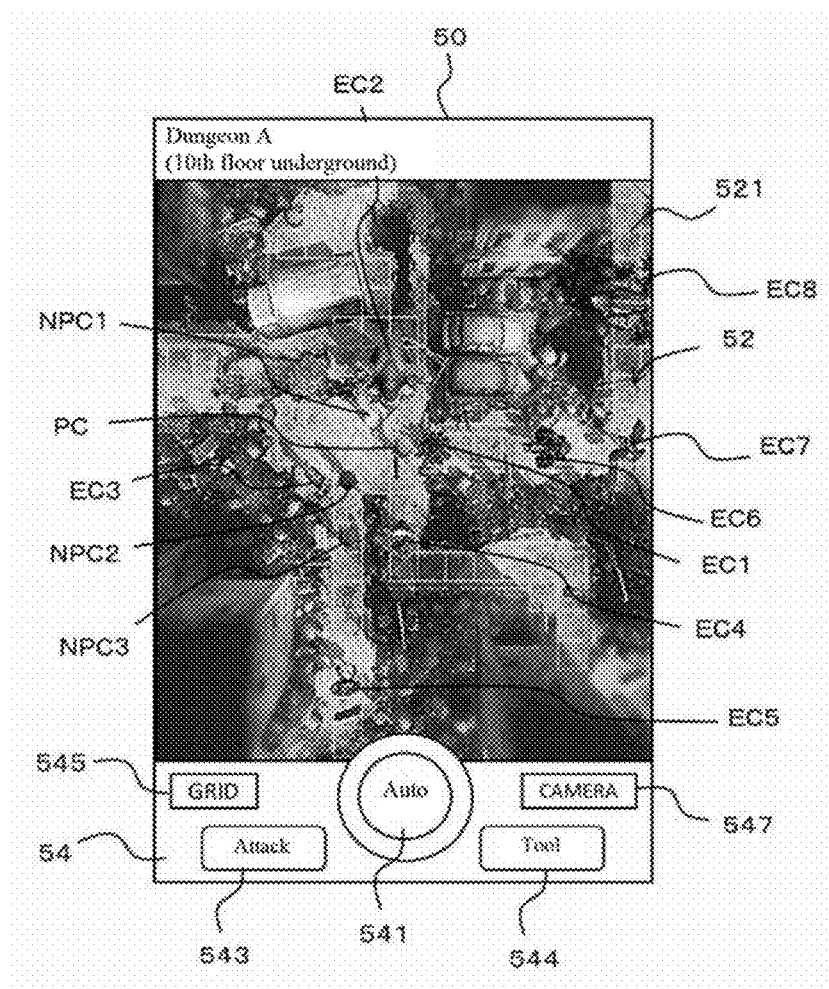
FIG. 5 A diagram showing an example of the game screen 50 in bird's-eye view.

Also, when a tap operation is performed on the camera switching button 547, the position of the virtual camera for displaying an image of the game space in the game space display area 52 is switched between normal mode and bird's-eye view mode. The game screen 50 shown in FIG. 4 corresponds to when the position of the virtual camera is in normal mode. Also, FIG. 5 shows an example of the game screen 50 when the position of the virtual camera is bird's-eye view mode. Compared to the position of the virtual camera in normal mode, the position of the virtual camera in bird's-eye view mode is farther away from the player character and has a higher angle (a substantially perpendicular angle to the game field in the game space). As a result, compared to the game space display area 52 in normal mode shown in FIG. 4, an image with a wider field of view is displayed in the game space display area 52 in the bird's-eye view mode shown in FIG. 5, allowing the player to check a wider range of the game space. For example, enemy characters EC5 to EC8, which are not displayed in the game space display area 52 in FIG. 4, are displayed in the game space display area 52 in FIG. 5, and the player can find out where these enemy characters EC5 to EC8 are by looking at the game space display area 52 in bird's-eye view mode. In this example, the game screen 50 in bird's-eye view mode is configured so that an operation corresponding to the execution of a command for the player character cannot be performed.

Returning to the flowchart in FIG. 3, in step S110 an operation corresponding to the execution of a command for the player character is accepted. More specifically, an operation corresponding to the execution of a command is either an operation corresponding to the execution of a movement command (a tap operation in the movable area 521), an operation corresponding to the execution of an attack command (a tap operation on the attack button 543), an operation corresponding to a tool command (a tap operation on tool button 544), or an operation corresponding to the one-time execution of an automatically specified command (a tap operation on the auto button 541).

If an operation of the player is a tap operation on the auto button 541, then the command to be executed for the player character is automatically specified from among a movement command, an attack command, and a tool command (steps S115 and S120).

In this example, four rules are set as command specification rules to automatically specify commands. More specifically, these four rules consist of: a balance emphasis rule that emphasizes a good balance among movement commands, attack commands, and tool commands; an attack priority rule that prioritizes attack commands; a tool priority rule that prioritizes tool commands; and movement priority rule that prioritizes movement commands. The default command specification rule is the balance emphasis rule. When a tap operation is performed on the auto button 541 in manual mode, commands are automatically specified according to the balance emphasis rule. As will be discussed in detail below, the other three rules are set in response to the player's operations in auto mode, and are rules that are only applicable in auto mode. These command specification rules are an example of rules for causing the game to proceed automatically.

When an operation corresponding to the execution of a command is thus accepted, the command is executed for the player character (step S130). More specifically, a movement command is executed when a tap operation is performed on the movable region 521, an attack command is executed when a tap operation is performed on the attack button 543, a tool command is executed when a tap operation is performed on the tool button 544, and an automatically specified command is executed when a tap operation is performed on the auto button 541. The player character moves, attacks, or uses an item in response to the execution of a command.

When a command for the player character is executed, actions of non-player characters are then performed (step S140). Actions of non-player characters are moves or attacks, and are automatically specified on the basis of the command executed for the player character in step S130. For example, when a movement command is executed for the player character, a non-player character moves so as to follow the player character.

Also, if an attack command or tool command is executed for the player character, for example, non-player characters perform an attack against enemy characters within the attack range. For example, on the game screen 50 in FIG. 4, when an attack command against an enemy character EC1 is executed for the player character PC, a non-player character NPC1 performs an attack against an enemy character EC2 adjacent above, a non-player character NPC2 performs an attack against an enemy character EC3 adjacent to the left side, and a non-player character NPC3 performs an attack against an enemy character EC4 located on the other side of an obstacle to the right. If there are no enemy characters within the attack range of the non-player characters, the non-player characters move to the position of the closest enemy character, or wait without doing anything. Thus, the actions of non-player characters may include just waiting without doing anything.

Thus, when a non-player character performs an action, the player-side turn ends, and then an enemy character performs an action (step S150). In this example, the enemy characters counterattack when attacked by the player character or non-player characters, but if they are not attacked, they wait without doing anything. Counterattack, like attack, is processing that inflicts damage on the character being counterattacked. An enemy character that is not under attack may move in accordance with a specific rule.

When an enemy character performs an action, the enemy-side turn ends, and if a condition for ending the game has not been met (No in step S160), the flow returns to step S100, and it is once again the player's turn. Conditions for ending the game are, for example, that the HP of the player character is 0, or that a stage is cleared. Thus, in the game in this example, the player side and the enemy side take turns until a condition for ending the game is met.

In manual mode, auto mode is initiated when a long tap operation is performed on the auto button 541. When auto mode is initiated, a command to be executed is automatically specified without any operation corresponding to the execution of a command by the player being received (steps S100 and S120). After this, auto mode continues until the touch state on the auto button 541 is cancelled.

As discussed above, because the actions of non-player characters and enemy characters are automatically controlled, in auto mode the actions of all characters, including the player character, are automatically controlled, and the player can see how the game is proceeding automatically by looking at the game space display area 52 of the game screen 50.

Figure 6:
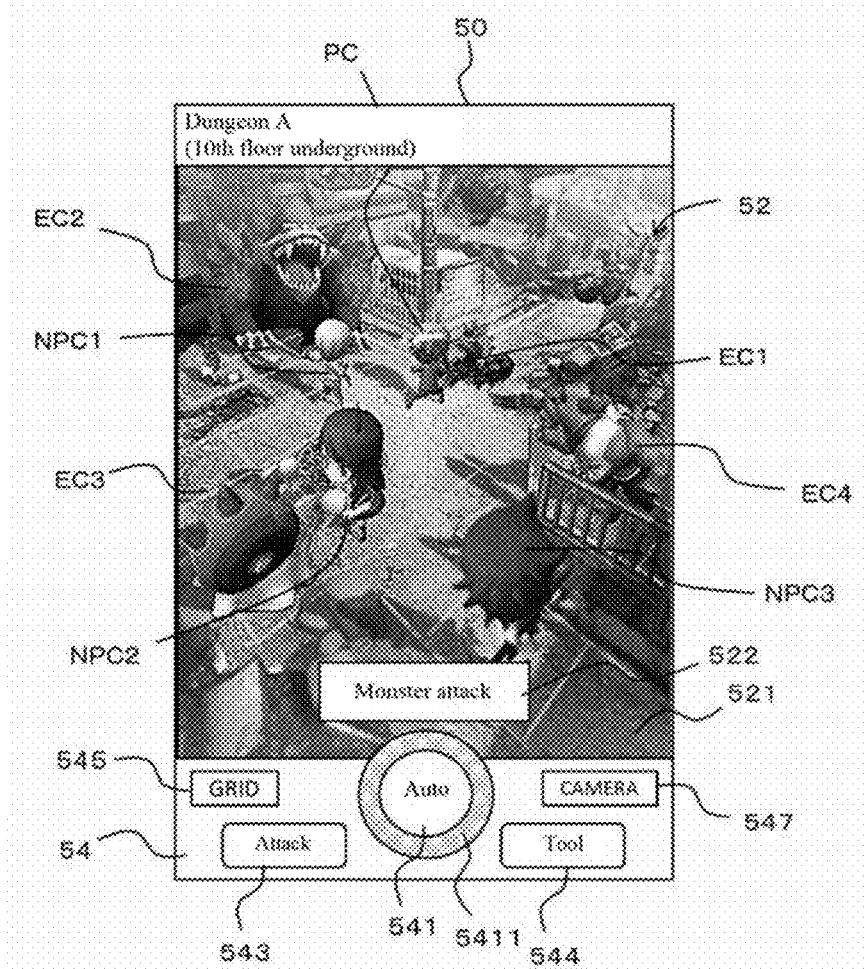
FIG. 6 A diagram showing an example of the game screen 50 in auto mode.

In this example, the position of the virtual camera in auto mode is different from the position of the virtual camera in manual mode. FIG. 6 shows an example of the game screen 50 in auto mode. The position of the virtual camera in auto mode is closer to the player character PC and has a lower angle than the position of the virtual camera in manual mode corresponding to FIG. 4. As a result, an image with a narrower field of view and superior realism is displayed in the game space display area 52 in auto mode shown in FIG. 6, as compared to the game space display area 52 in manual mode shown in FIG. 4.

Also, as shown in FIG. 6, a command display area 522 is displayed on the game screen 50 in auto mode, near the bottom of the game space display area 52 (the top of the auto button 541). The command display area 522 displays the last command automatically executed for the player character (in the example in FIG. 6, text corresponding to an attack command and reading "Monster attack" is displayed). In another embodiment, the command display area 522 can be configured to display a specific number (two or more) of commands executed most recently and/or a specific number of commands that have yet to be executed, instead of last command that was executed. Also, as shown in FIG. 6, on the game screen 50 in auto mode, the display mode (such as the color) of the outer ring 5411 of the double-circle-shaped auto button 541 changes. Once the auto mode is cancelled (ends), the display mode of the ring 5411 goes back to its original state.

Figure 7A:
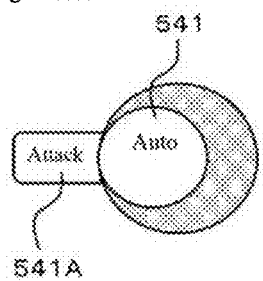
FIGS. 7(A)-(D) Diagrams showing examples of the display mode of an auto button 541 that changes in response to a swipe operation.

In this example, the game screen 50 is configured so that the setting of command specification rules in auto mode and the locking of the auto mode are performed in response to a swipe operation (third operation) on the auto button 541 in auto mode. FIG. 7 is a diagram showing examples of the display mode of the auto button 541, which changes in response to swipe operations. The auto button 541 is configured so that a command specification rule corresponding to the direction of the swipe operation is set by a swipe operation in the left or right direction or downward. FIG. 7A shows an example of the auto button 541 when a swipe operation is performed to the left, in which case the inner circle of the double-circle-shaped auto button 541 is biased to the left, and on the left side is displayed a tab-shaped display area 541A in which "attack" is displayed. A swipe operation to the left is an operation for setting an attack priority rule in which an attack command is prioritized when the player character fights with an enemy character, and as long as a state of being swiped to the left is maintained, commands are automatically specified according to this attack priority rule.

Figure 7B:
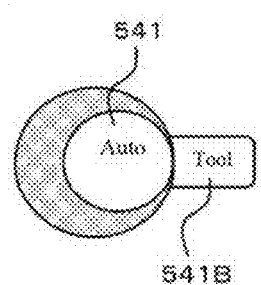
Figure 7C:
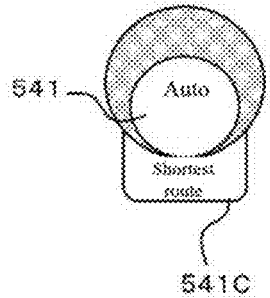

Similarly, FIG. 7B shows an example of the auto button 541 when a swipe operation is performed to the right, in which case the inner circle of the auto button 541 is biased to the right, and on the right side is displayed a tab-shaped display area 541B in which "tool" is displayed. A swipe operation to the right is an operation for setting a tool priority rule in which a tool command is prioritized when the player character fights with an enemy character, and as long as a state of being swiped to the right is maintained, commands are automatically specified according to this tool priority rule. Similarly, FIG. 7C shows an example of the auto button 541 when a swipe operation is performed downward, in which case the inner circle of the auto button 541 is biased downward, and on the lower side is displayed a tab-shaped display area 541C in which "shortest route" is displayed. A downward swipe operation is an operation that sets a movement priority rule in which a movement command is prioritized so that the player character moves in the game space from the current location toward the destination (the exit of a dungeon, etc.) using the shortest route, and as long as a state of being swiped downward is maintained, commands are automatically specified according to this movement priority rule.

The command specification rules discussed above are just examples, and various other command specification rules can also be applied, such as an enemy priority rule (a rule that prioritizes a battle with an enemy character that appears in the game space), or an item acquisition priority rule (a rule that prioritizes the acquisition of items disposed in the game space).

Figure 7D:
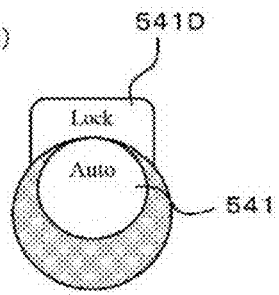

Also, the auto button 541 is configured so that the locking of auto mode is accomplished by an upward swipe operation. FIG. 7D shows and example of the auto button 541 when a swipe operation is performed upward, in which case the inner circle of the auto button 541 is biased upward, and on the upper side is displayed a tab-shaped display region 541D in which "lock" is displayed. Even if the touch state of the auto button 541 is cancelled, as long as the state of being swiped upward is maintained, the auto mode is maintained (auto mode is locked) without ending. When the auto mode has been locked, auto mode ends when an operation corresponding to the execution of a command for the player character (specifically, a tap operation on the movable area 521, the attack button 543, the tool button 544, or the auto button 541) is performed.

Figure 8:
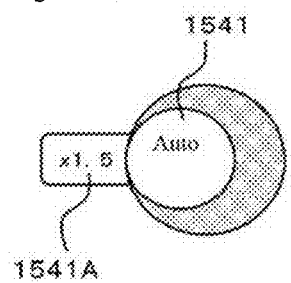
FIGS. 8(A)-(D) Diagrams showing examples of the display mode of an auto button 1541 that change in response to a swipe operation.
Figure 8:
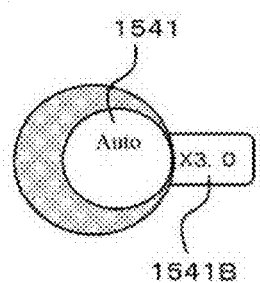
Figure 8:
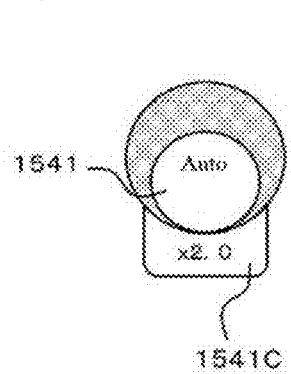
Figure 8:
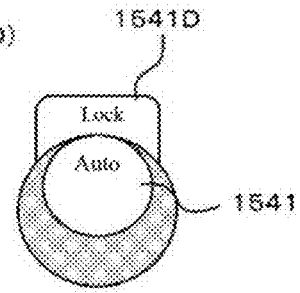

In the example given above, the setting of command specification rules in auto mode and the locking of the auto mode were performed in response to swipe operations on the auto button 541 in auto mode, but in another specific example pursuant to this embodiment, the setting of the speed at which the game proceeds automatically is performed instead of setting a command specification rule. FIG. 8 shows examples of a display mode that changes depending on the swipe operation of the auto button 1541 in this other specific example. The auto button 1541 is configured so that the speed at which the game proceeds is set by a swipe operation in the left or right direction or downward, corresponding to the direction of the swipe operation. FIG. 8A shows an example of the auto button 1541 when a swipe operation is performed to the left, in which case on the left side is disposed a tab-shaped display area 1541A in which "×1.5" is displayed, and a speed of 1.5 times the normal speed (the speed when no swipe operation is performed on the auto button 541) is set as the speed at which the game proceeds. Similarly, FIG. 8B shows an example of the auto button 1541 when a swipe operation is performed to the right, in which case on the right side is disposed a tab-shaped display area 1541B in which "×3.0" is displayed, and a speed of 3.0 times the normal speed is set as the speed at which the game proceeds. Similarly, FIG. 8C shows an example of the auto button 1541 when a swipe operation is performed downward, in which case on the lower side is disposed a tab-shaped display area 1541C in which "×2.0" is displayed, and a speed of 2.0 times the normal speed is set as the speed at which the game proceeds. When the speed at which the game proceeds is set in this way, the image is displayed in the game space display area 52 according to the set speed. The game progress speed in auto mode can also be referred to as the video reproduction speed corresponding to the game space in the game space display region 52. The auto button 1541, like the auto button 541 discussed above, is configured so that the locking of the auto mode is accomplished by an upward swipe operation (see FIG. 8D).

In the example given above, the setting of the control mode of the auto mode (command specification rule or game progress speed) and the locking of the auto mode were configured to be performed on the basis of the direction of a swipe operation, but in another specific example pursuant to this embodiment, the setting of the control mode and/or the locking of the auto mode can be performed on the basis of the distance of a swipe operation. Also, the setting of the control mode of the auto mode and/or the locking of the auto mode may be performed on the basis of an operation in which the touch panel is pressed firmly, rather than a swipe operation.

In the example given above, the auto mode ends in response to an operation to cancel the touch state on the auto button 541, but in addition to this, the auto mode may be ended upon entering a state in which it is necessary to warn the player (such as when the HP of the player character drops below a specific level).

With the user terminal 10 in the embodiment described above, an auto mode in which the game proceeds automatically is initiated in response to a first operation (such as a long tap operation on the auto button 541) to maintain a specific state of operation by the player (such as the touch state on the auto button 541), and this auto mode is ended in response to a second operation to cancel a specific state of operation by the player. Thus, an embodiment of the present invention involves initiating the auto mode in response to an operation to maintain a specific state of operation, and ending the auto mode in response to an operation to cancel this specific state of operation, and therefore the start and end of auto mode are realized by a simple, continuous operation. As a result, operation related to the automatic progress of the game is facilitated.

In another embodiment of the present invention, information managed by the game management server 30 can be managed by the user terminal 10, and the function of the game management server 30 can be integrated into the user terminal 10.

The processing and procedures described in this Specification are realized by software, hardware, or any combination thereof, in addition to what was explicitly described. For example, the processing and procedures described in this Specification can be realized by installing a logic circuit corresponding to said processing and procedures in an integrated circuit, a volatile memory, a nonvolatile memory, a magnetic disk, or another such medium. Also, the processing and procedures described in this Specification can be implemented as a computer program (e.g., non-transitory computer-readable medium having a storage including instructions to be performed by a processor) corresponding to said processing and procedures, with said program being executed by any kind of computer.

The processing and procedures described in this Specification were described as being executed by a single device, software, component, or module, but such processing or procedures can also be executed by a plurality of devices, a plurality of software packages, a plurality of components, and/or a plurality of modules. Also, the elements of software and hardware described in this Specification can be integrated into fewer constituent elements, or can be realized by breaking them up into the more constituent elements.

In this Specification, whether the constituent elements of the invention are described as being either singular or plural, or are described without being limited to singular or plural, said constituent elements may be either singular or plural, except when they should be construed otherwise due to context.

DESCRIPTION OF THE REFERENCE NUMERALS 10 user terminal
20 network
30 game management server
41 information storage and management component
43 game progress controller
50 game screen
521 movable area
541 auto button
543 attack button
544 tool button

The invention claimed is:

1. A non-transitory computer-readable medium having a storage including instructions to be performed by a processor, for providing a game,
wherein, in response to being executed on a computer, said instructions cause the computer to execute a process comprising:
controlling the progress of the game in a manual mode in which the game proceeds in response to an operation by a player;
initiating an auto mode in which the game proceeds automatically in response to a long tap operation maintained on a specific object displayed on a screen;
controlling the progress of the game in the auto mode; and
for cancellation of the long tap operation maintained on the specific object displayed on the screen being accompanied with a swipe operation, continuing the auto mode; and
for cancellation of the long tap operation maintained on the specific object displayed on the screen not being accompanied with a swipe operation, ending the auto mode.

2. The non-transitory computer-readable medium according to claim 1, wherein the controlling the progress of the game in the auto mode includes setting the control mode of the auto mode in response to another operation on the specific object by the player.

3. The non-transitory computer-readable medium according to claim 2, wherein the control mode comprises rules configured to cause the game to proceed automatically.

4. The non-transitory computer-readable medium according to claim 2, wherein the control mode includes the speed at which the game proceeds automatically.

5. The non-transitory computer-readable medium according to claim 2,
wherein the another operation is another swipe operation, and
the controlling the progress of the game in the auto mode includes setting the control mode based on a direction of the swipe operation on the specific object.

6. The non-transitory computer-readable medium according to claim 2,
wherein the another operation is another swipe operation, and
the controlling the progress of the game in the auto mode includes setting the control mode based on a distance over which the specific object is swiped.

7. The non-transitory computer-readable medium according to claim 1, wherein the ending the auto mode includes ending the auto mode in response to the state of the game.

8. The non-transitory computer-readable medium according to claim 1,
wherein the game is configured to proceed in response to the execution of a command,
the controlling the progress of the game in the manual mode includes executing a command in response to another operation by the player, and
the controlling the progress of the game in the auto mode includes repeating the execution of automatically specified commands.

9. The non-transitory computer-readable medium according to claim 8,
wherein
the controlling the progress of the game in the manual mode includes executing an automatically specified command one time in response to a touch operation on the specific object.

10. The non-transitory computer-readable medium according to claim 8, wherein the controlling the progress of the game in the auto mode includes displaying an automatically specified command.

11. The non-transitory computer-readable medium according to claim 8, wherein the game proceeds by alternately repeating a turn in which the player side acts based on at least the execution of a command and a turn in which the enemy side acts automatically.

12. A system for providing a game, comprising one or more computer processors, said system causing the one or more computer processors to execute, in response to the execution of a readable command, operations comprising:
controlling progress of the game in a manual mode in which the game proceeds in response to an operation by a player;
initiating an auto mode in which the game proceeds automatically in response to a long tap operation maintained on a specific object displayed on a screen;
controlling the progress of the game in the auto mode; and
for cancellation of the long tap operation maintained on the specific object displayed on the screen being accompanied with a swipe operation, continuing the auto mode; and
for cancellation of the long tap operation maintained on the specific object displayed on the screen not being accompanied with a swipe operation, ending the auto mode.

13. The system according to claim 12, wherein the the controlling the progress of the game in the auto mode includes setting the control mode of the auto mode in response to another operation on the specific object by the player, and the control mode comprises rules configured to cause the game to proceed automatically.

14. The system according to claim 13, wherein the control mode includes the speed at which the game proceeds automatically.

15. The system according to claim 13,
wherein the another operation is another swipe operation, and
the controlling the progress of the game in the auto mode includes setting the control mode based on a direction of the swipe operation on the specific object.

16. The system according to claim 13,
wherein the another operation is another swipe operation, and
the controlling the progress of the game in the auto mode includes setting the control mode based on a distance over which the specific object is swiped.

17. The system according to claim 13,
wherein the game is configured to proceed in response to the execution of a command,
the controlling the progress of the game in the manual mode includes executing a command in response to an operation by the player, and
the controlling the progress of the game in the auto mode includes repeating the execution of automatically specified commands.

18. The system according to claim 17,
wherein the controlling the progress of the game in the manual mode includes executing an automatically specified command one time in response to a touch operation on the specific object, wherein the controlling the progress of the game in the auto mode includes displaying an automatically specified command, and the game proceeds by alternately repeating a turn in which the player side acts based on at least the execution of a command and a turn in which the enemy side acts automatically.

* * * * *